C. ANDRADE, Jr.
WINDLASS.
APPLICATION FILED FEB. 14, 1910.

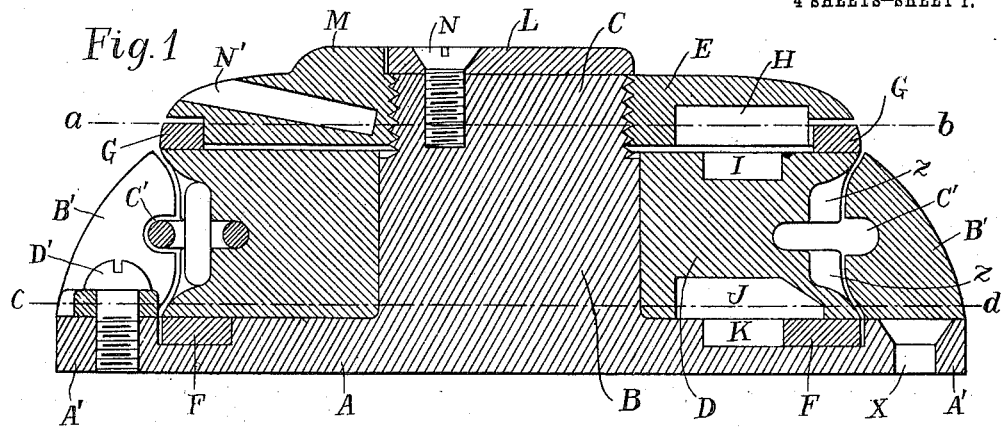
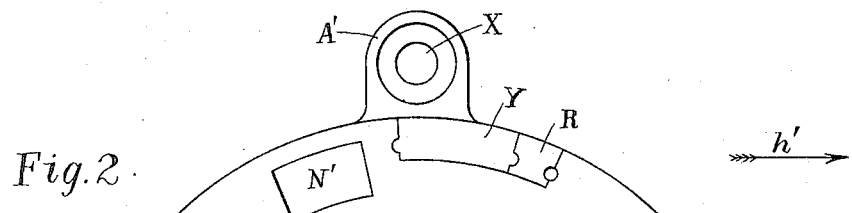
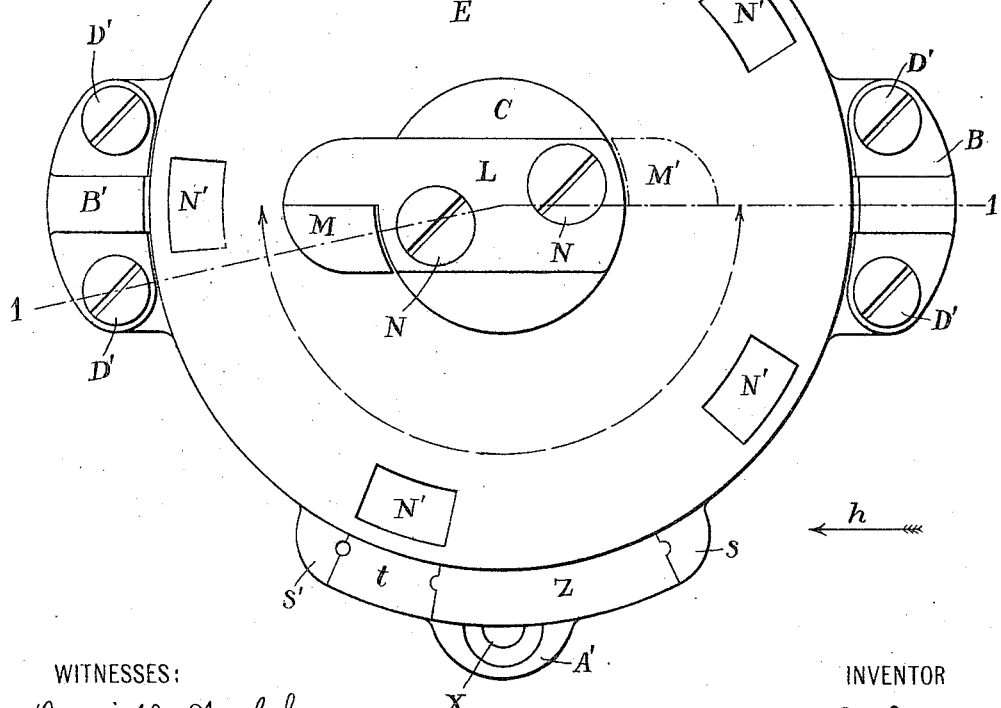

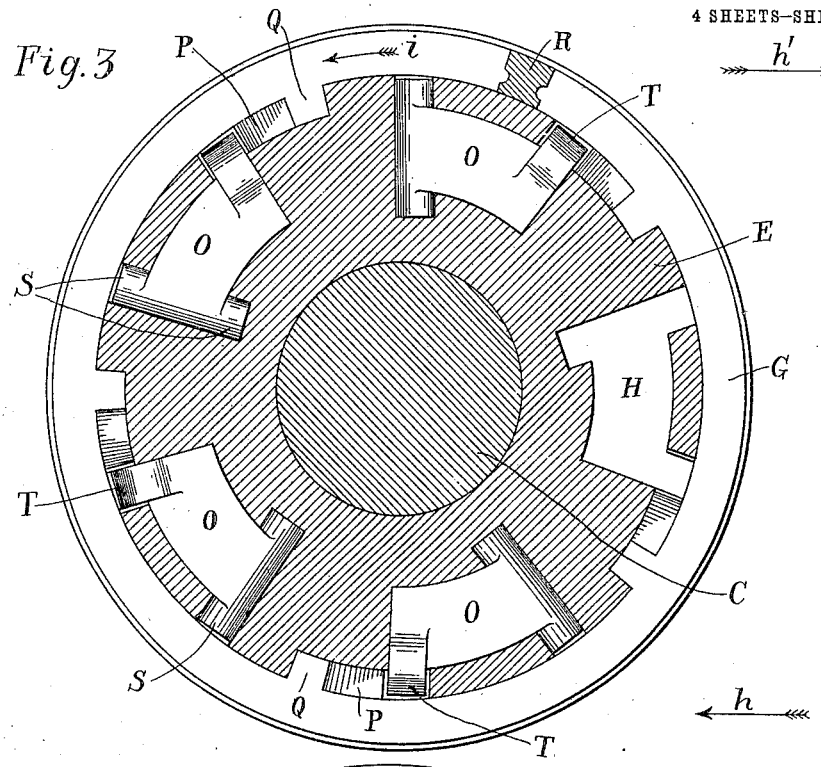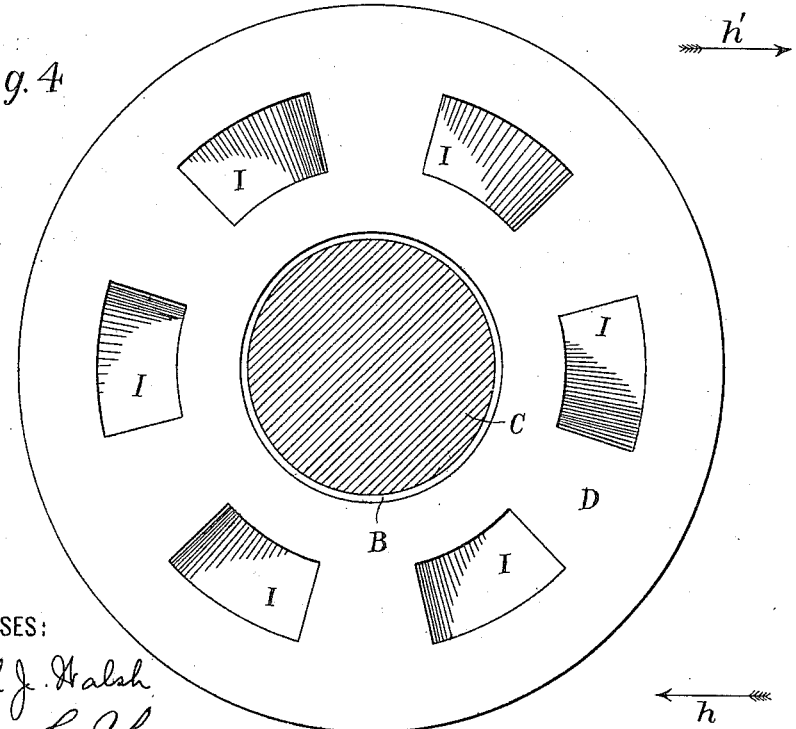

971,716.

Patented Oct. 4, 1910.

4 SHEETS—SHEET 3.

WITNESSES:
David J. Walsh
Arthur C. Johnson

INVENTOR
Cipriano Andrade Jr.

UNITED STATES PATENT OFFICE.

CIPRIANO ANDRADE, JR., OF NEW YORK, N. Y.

WINDLASS.

971,716.   Specification of Letters Patent.   Patented Oct. 4, 1910.

Application filed February 14, 1910.   Serial No. 543,828.

*To all whom it may concern:*

Be it known that I, CIPRIANO ANDRADE, Jr., a citizen of the United States, residing at 328 West Eighty-fourth street, in the city of New York, in the county of New York and State of New York, have invented a new and useful Windlass, of which the following is a specification.

My invention relates to improvements in windlasses; and the objects of my invention are; first to provide a form of windlass which shall occupy less space than the devices heretofore used for similar work; second, to provide a form of windlass which shall weigh less than the devices heretofore used for similar work; third, to provide a form of windlass which shall be cheaper and simpler to manufacture than the devices heretofore used for similar work; fourth, to provide a form of windlass which cannot be fouled by ropes or other articles on a vessel's deck or elsewhere; fifth, to provide a form of windlass that can be braked and controlled without the use of a brake band; sixth, to provide a form of windlass which can be braked by a simple movement of the same handle which operates the "heaving in" motion of the windlass, thus doing away with the brake handle; seventh, to provide a windlass whose axis of rotation is substantially vertical, and which is operable by a handle bar having a reciprocating motion of rotation in a substantially horizontal plane, and without the use of gear wheels. The great advantage of a windlass with a vertical axis of rotation is that it can be fixed directly to the deck. Whereas a windlass with a horizontal axis has to be fastened to a samson post, or some equivalent thereof, thus wasting deck space, weight, and expense of construction. Up to the present time, all windlasses with a vertical axis of rotation have been operated either; first, by handle bars with a continuous motion of rotation in one direction, as with the old fashioned capstan; or second by the medium of toothed gear wheels. The objection to the first method is that the operator of the capstan has to walk completely around the capstan at each revolution thereof, thus using a large area of deck space for the operation of the capstan. The objection to the second method is that toothed gear wheels are expensive to manufacture, and soon wear down, giving rise to lost motion. I attain these objects by the mechanism illustrated in the accompanying drawings, in which—

Figure 5:
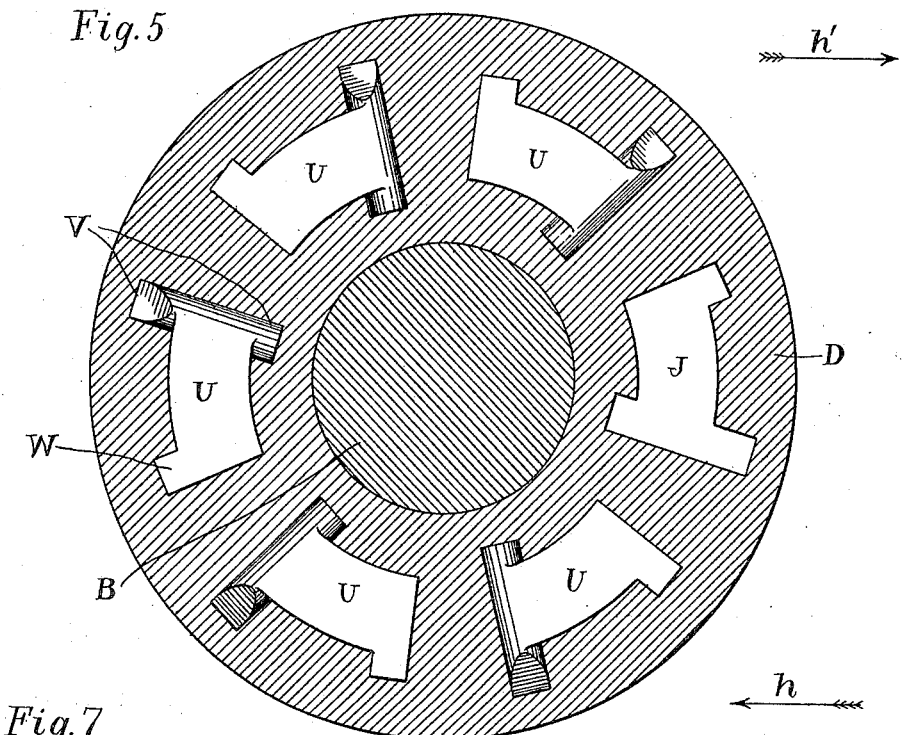
Figure 7:
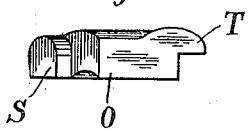
Figure 8:
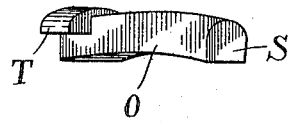
Figure 10:
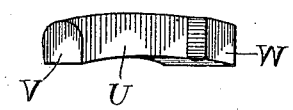
Figure 9:
Figure 11:
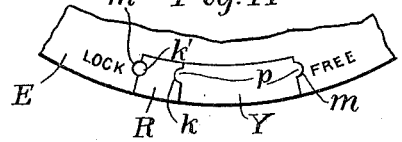
Figure 12:
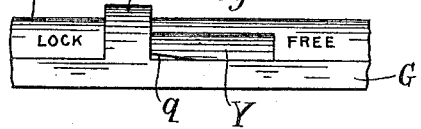
Figure 6:
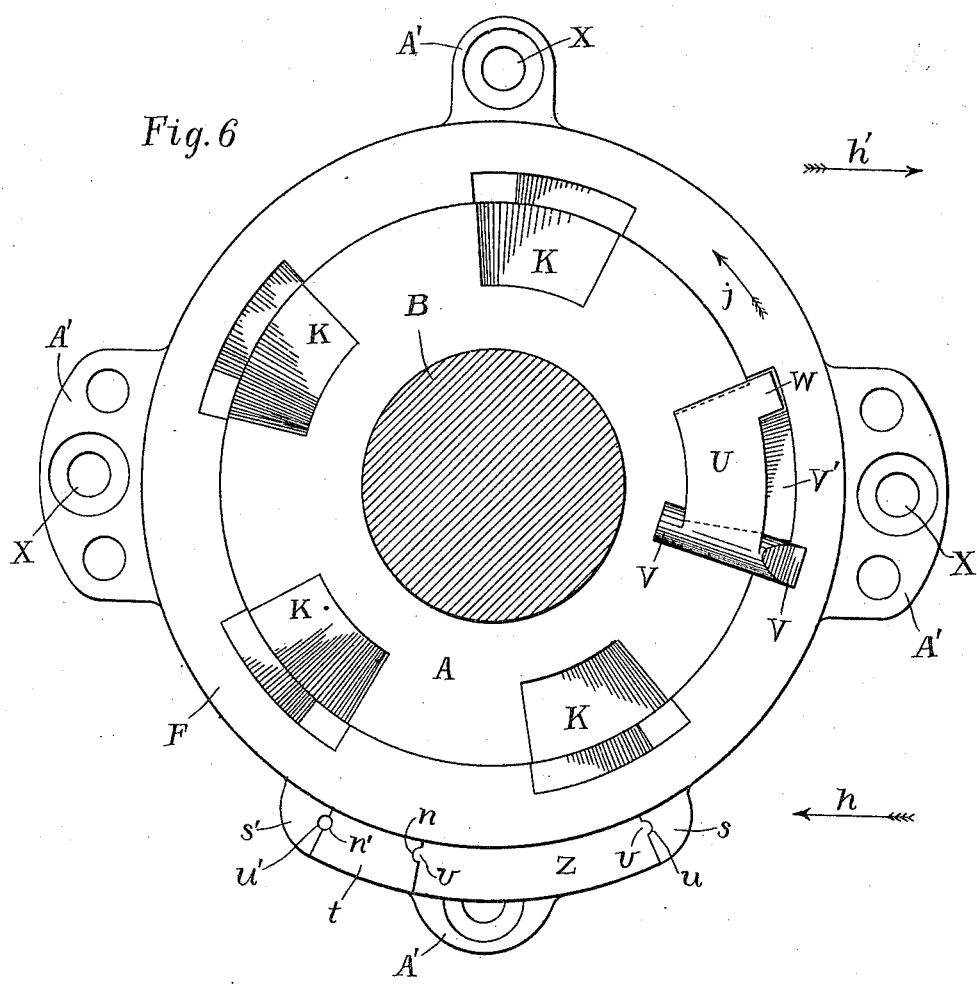
Figure 13:
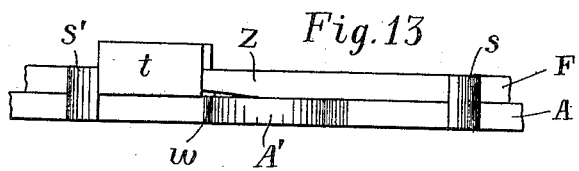
Figure 14:
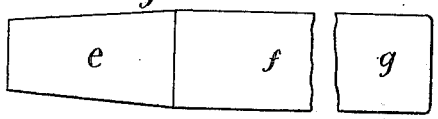
Figure 15:
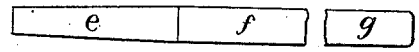

Figure 1 is a sectional elevation of my device, taken on the line 1—1 (Fig. 2); Fig. 2 is a plan view of the top of my device; Fig. 3 is a horizontal section of my device taken in the plane *a b* of Fig. 1; Fig. 4 is a plan view of the top of the sheave; Fig. 5 is a horizontal section of my device taken in the plane *c d* of Fig. 1; Fig. 6 is a plan view of the top of the bed plate of my device; Fig. 7 is an end view of an upper pawl; Fig. 8 is a side view of an upper pawl; Fig. 9 is an end view of a lower pawl; Fig. 10 is a side view of a lower pawl; Fig. 11 is a detail plan view of the locking device for the upper trip ring; Fig. 12 is a detail elevation of the locking device for the upper trip ring; Fig. 13 is a detail elevation of the locking device for the lower trip ring; Fig. 14 is a plan view of the taper end of a handle bar; Fig. 15 is an elevation of the taper end of a handle bar.

Similar letters refer to similar parts throughout the several views.

A is a bed plate; B is a pin integral with bed plate A and perpendicular thereto; C is a threaded portion at the upper end of pin B (a left hand thread will be preferably used with the direction of chain hereinafter mentioned); D is a sheave rotating freely about pin B as an axis; E is a top plate threaded to thread C; F is a trip ring rotating to a limited extent about the periphery of bed plate A; G is a trip ring rotating to a limited extent about the periphery of top plate E; H are recesses in top plate E to hold the pawls O, I show five such recesses and pawls, although only one or any other number would suffice to make my device operative; I are recesses in the top of sheave D to take the lower ends of pawls O, I show six such recesses, although only one or any other number would suffice to make my device operative; J are recesses in the bottom of sheave D to hold the pawls U, I show six such recesses and pawls, although only one or any other number would suffice to make my device operative; K are recesses in the top of bed plate A to take the lower ends of pawls U, I show five such recesses, although only one or any other number would suffice to make my device operative; L is a stop piece fastened to the top of thread C by screws N, L is so placed as to be about 180 degrees back from the lowest possible point of rotation of top plate E as will be later described; M is a stop lug integral with top plate E; N' are taper sockets let into top plate E to take the end $e$ of handle bar $j$, whose handle is $g$, the intervening length of handle bar has been represented as broken away; O is a pawl fitting into recess H in the bottom of top plate E; S are trunnions integral with pawl O; T is a lug at the movable end of pawl O; Q is a lug integral with trip ring G and with its top level with the top of trip ring G; P is a wedge integral with trip ring G, the lower end of wedge P is level with the bottom of trip ring G and is nearest to lug T, and the higher end of wedge P is level with the top of trip ring G, and is nearest to lug Q; R is a lug handle integral with trip ring G; U is a pawl fitting into recess J at the bottom of the sheave E; V are trunnions integral with pawl U; W is a lug at the movable end of pawl U; X are holes in bed plate A for bolts, to hold the entire device down; V' is a wedge integral with trip ring F, the lower end of wedge V' is level with the bottom of trip ring F, and is next to lug W, the upper end of wedge V' is level with the top of trip ring F, and is next to lug V; $s\ s'$ are stop lugs integral with bed plate A; $t$ is a lug handle integral with trip ring F; Z is a lock block whose ends have vertical tongues $v$ fitting into vertical grooves $u$ in stop lug $s$ and $n$ in handle $t$; $w$ is an inclined portion on the bottom of lock plate Z; $n'$ is a vertical groove in handle $t$, $u'$ is a vertical groove in stop lug $s'$; Y is a lock block whose ends have vertical tongues $p$ fitting into vertical grooves $m$ in top plate E and $k$ in handle R; $q$ is an inclined portion in the bottom of lock plate Y; $k'$ is a vertical groove in handle R; $m'$ is a vertical groove in top plate E; $z$ are whelps on the edge of sheave D to catch the links of the chain; A' are projections integral with bed plate A; B' is a nonfouling, removable, fairlead, whose function is to hold the chain from dropping from sheave D in case of a sudden slackening of the tension on the chain; C' is a recess in fairlead B' to permit the passage of the chain links; D' are screws fastening fairlead B' to two of the projections A'.

It will be understood that where my device is used for rope, the whelps will be omitted, and the periphery of the sheave D will be finished as a smooth or grooved drum as is the common practice at the present time.

It will be observed by reference to the drawings, that pawl spaces H and J and pawls O and U are deeper than pawl recesses I and K. The advantage derived from this form of construction is as follows:—Suppose that the depth of pawl U were only equal to or less than the depth of recess K. Then in case the following faces of trunnions V became worn, it is quite possible that the lower face of sheave D would ride up on top of pawl U at the pawl's following end, which would result in wedging sheave D up from bed plate A. If trunnions V should be accidentally broken, this trouble would be aggravated, and the breaking of the trunnions on one pawl would throw the entire windlass out of operation. But when pawl U is made deeper than recess K, then in case of any defect in trunnions V, the square following end of pawl U, projecting above recess K, will be pushed forward by the following face of the recess in sheave E, and there will be no possibility of any jamming or wedging action as in the case first supposed.

It will be observed that the bottom of pawl O has a rounded recess. This is to prevent the pawl from "flipping" up at the moment of starting to leave its lower socket I. With the curved bottom shown, the pawl will ride up gradually with the bottom of its free end bearing on the inclined surface of socket I. The same remarks apply to the curve in the bottom of pawl U. It will also be observed that the ends of the bottom of pawl O (the lower side of trunnion S, and the end under lug T) are flat. This is so as to give a larger wearing surface than would be the case if trunnions S were left round on their lower side, and the end under lug T were left as a sharp edge. The same remarks apply to the ends of the bottom of pawl U.

By reference to Fig. 6, it will be observed that the outer trunnion V extends farther out from the center of the windlass than the trip lug W, or the wedge V'. The object of this arrangement is, in order that the leading end of pawls U may at all times be kept level. Were it not for the arrangement shown, and unless outer trunnion V did in fact extend out beyond the wedge V', then the outer side of the leading edge of pawls U would tend to fall into recesses K during the operation of the windlass.

It will be observed that in Fig. 1, the trip ring F for the lower pawls U, is set with its upper face flush with the lower face of the pawl trunnions V, so that when pawls U are tripped, the lower face of the pawl rests on the same level as the upper face of the trip ring F. It will also be observed that in Fig. 1, the trip ring G for the upper pawls O, is set with its lower face flush with the lower face of the pawl trunnion S, so that when pawls O are tripped, the lower face of the pawls rests on the same level as the lower face of the trip ring G. It should be understood, however, in Fig. 1, that both of the trip rings might be of the type shown by F; or both of the trip rings might be of the type shown by G; or the upper trip ring might be of the type shown by F, and the lower trip ring might be of the type shown by G. The only difference in the operation of the two rings is, that with a ring of type G, the ring rotates with the pawls, having simply a limited tripping motion with reference to the pawls; whereas with a ring of type F the pawls rotate freely with reference to the trip ring.

The operation of my device is as follows: First turn the top plate E in a direction familiarly called "against the hands of the watch" until the lower surface of top plate E presses tight against the top of sheave D. The lug M on top of top plate E will now be in the position M′ (Fig. 2), this is the limit of motion for top plate E in this direction, as top plate S can descend no farther. The entire motion of top plate E is thus limited to 180 degrees indicated by the dotted lines between M′ and M. Of course, the exact degree of rotation for top plate E may vary in different windlasses, being determined by the length of handle bar, pitch of thread C and other considerations, so that it may be less or more than 180 degrees without materially affecting the operation of my device. The lug M and stop piece L may be omitted without affecting the operation of my device. The trip ring F is in the position shown in Fig. 6, thus permitting the pawl U to engage in recesses K. The trip ring G is in the position shown in Fig. 3, thus permitting the pawl O to engage in recesses I. Handle bar $f$ is now taken, and its taper end $e$ is inserted into one of the sockets N′. A chain is led from the direction $h$ (Fig. 2) around the edge of sheave D, and away in the direction $h'$, the links of the chain being placed between whelps $z$. By means of handle $g$ and bar $f$, top plate E is made to rotate say about 120 degrees in the direction $h$; during this operation one of the pawls O, engaging in one of the recesses I, carries the sheave D in the same direction as top plate E, and a length of chain is thus drawn in from the direction $h$ and discharged in the direction $h'$. A light tension is, of course, to be maintained on the chain when it leaves sheave D in the direction $h'$. This tension may be by hand pull, or by leading the chain down a pipe through the deck of the vessel as is commonly the practice with anchor chains, &c., in which case the weight of the chain going down through the pipe keeps the proper tension on the chain. At the end of the 120 degrees of rotation just mentioned, the handle $g$ carrying with it top plate E is rotated backward against the direction $h$ say 90 degrees to a point near the original starting point. It is desirable not to carry the backward motion to the point of jamming top plate E against sheave D. During the backward motion of top plate E, the sheave D is held motionless by one of the pawls U engaging in one of the recesses K in bed plate A; at the same time the pawls O in top plate E slide back over recesses I in the top of sheave D. Thus by successive reciprocating movements of handle $g$, sheave D is rotated steadily in the direction $h\ h'$, and any desired length of chain may be drawn in from the direction $h$ and discharged in the direction $h'$.

Suppose now, that it is desired to hold the chain fast. We turn top plate E back against the direction $h$ until it strongly jams down on sheave D. In this position, sheave D is held fast by the friction of its upper and lower faces against top plate E and bed plate A. As sheave D is held fast, so, of course, is the chain. While sheave D is thus held by friction between top plate E and bed plate A, it should be noted that trip rings F and G should not be jammed, but should be free to rotate so far as any pressure exerted by E is concerned. This is accomplished by suitable machining of the trip rings F and G and the adjoining parts of the device.

Suppose now, that it is desired to pay out the chain. Top plate E is left jammed down against sheave D; and the next operation is to trip both the upper and lower set of pawls. This is accomplished as follows: To trip the upper pawls—press down on the end of lock plate Y, over inclined portion $q$, which will throw the other end of lock plate Y out of groove $m$ (Figs. 11 and 12), and lift lock plate Y out of its place. Push lug handle R to the right until it comes against the end of the recess in top plate E at $m$. By this means, the trip ring G is rotated a few degrees in the direction of the arrow $i$ (Fig. 3); whereby wedge P, engaging lug T, raises lug T on top of lug Q, and thus trips pawl O. In order to make all secure, lock plate Y is now dropped into place between grooves $k'$ and $m'$. By this means, all the pawls O in top plate E are securely and permanently tripped. To trip the lower pawls: press down on the end of lock plate Z, over inclined portion $w$, which will throw the other end of lock plate Z out of groove $u$ (Figs. 6 and 13), and lift lock plate Z out of its place. Push handle $t$ to the right until it comes against the lug $s$. By this means the trip ring F is rotated a few degrees in the direction of the arrow $j$ (Fig. 6), whereby wedge V′, engaging lug W, raises lug W on top of trip ring F, and thus trips pawl U. In order to make all secure, lock plate Z is now dropped into place between grooves $n'$ and $u'$. By this means, all the pawls in sheave D are securely and permanently tripped. Sheave D is now held merely by the friction caused by the pressure of top plate E, and in order to pay out the chain, all that is necessary is to relieve the pressure of top plate E by moving the handle g in the direction h h'. This causes top plate E also to rotate in the direction h h' and thus to lift on thread C, and to lessen the friction on sheave D, whereupon sheave D is free to rotate, and the chain pays out. The outward movement of the chain can be controlled, checked or completely stopped, by decreasing or increasing the friction between top plate E and sheave D, by moving handle g in one direction or the other.

It will of course be understood that I do not limit myself to a handle bar operated by manual power; but any steam, electric, or other power means may be employed to impart a limited reciprocating motion of rotation to top plate E.

There are certain improvements in pawl and ratchet mechanisms, shown and described in this specification and the drawings accompanying the same, and originally claimed by me in this specification, which I have been required by the Patent Office to divide, and I am making a divisional application, Serial Number 568,582 to cover such pawl and ratchet mechanism.

I claim:

1. In windlasses, in combination; a bed plate, having a recess in its top face; a central pin perpendicular to said bed plate and integral therewith; a thread on the upper portion of said pin; a sheave rotating freely about said pin as an axis, the lower face of said sheave resting on the upper face of said bed plate, said sheave having a recess in its top face; a top plate threaded to the thread at the upper portion of said pin, said top plate having a limited reciprocating motion of rotation about said thread, said motion being limited in one direction by contact between the lower face of said top plate and the upper face of said sheave; a pawl let into the lower face of said top plate, said pawl engaging in said recess in the top face of said sheave, whereby said sheave is free to rotate in one direction with reference to said top plate, but not in the opposite direction; a pawl let into the lower face of said sheave, said pawl engaging in said recess in the top face of said bed plate, and coöperating with said pawl in the bottom face of said top plate, whereby said sheave is free to rotate in one direction with reference to said bed plate and top plate, but not in the opposite direction; means for imparting a limited reciprocating motion of rotation to said top plate; means for securing said windlass solidly to the deck or floor.

2. In windlasses, in combination; a bed plate, having recesses in its top face; a central pin perpendicular to said bed plate and integral therewith; a thread on the upper portion of said pin; a sheave rotating freely about said pin as an axis, the lower face of said sheave resting on the upper face of said bed plate, said sheave having recesses in its top face; a top plate threaded to the thread at the upper portion of said pin, said top plate having a limited reciprocating motion of rotation about said thread, said motion being limited in one direction by contact between the lower face of said top plate and the upper face of said sheave; pawls let into the lower face of said top plate, said pawls engaging in said recesses in the top face of said sheave, whereby said sheave is free to rotate in one direction with reference to said top plate, but not in the opposite direction; pawls let into the lower face of said sheave, said pawls engaging in said recesses in the top face of said bed plate, and coöperating with said pawls in the bottom face of said top plate, whereby said sheave is free to rotate in one direction with reference to said bed plate and top plate, but not in the opposite direction; means for imparting a limited reciprocating motion of rotation to said top plate; means for securing said windlass solidly to the deck or floor; means for tripping said pawls on the bottom of said top plate; means for tripping said pawls on the bottom of said sheave.

3. In windlasses, in combination; a bed plate, having recesses in its top face; a central pin perpendicular to said bed plate and integral therewith; a thread on the upper portion of said pin; a sheave rotating freely about said pin as an axis, the lower face of said sheave resting on the upper face of said bed plate, said sheave having recesses in its top face; a top plate threaded to the thread at the upper portion of said pin, said top plate having a limited reciprocating motion of rotation about said thread, said motion being limited in one direction by contact between the lower face of said top plate and the upper face of said sheave; pawls let into the lower face of said top plate, said pawls engaging in said recesses in the top face of said sheave, whereby said sheave is free to rotate in one direction with reference to said top plate, but not in the opposite direction; pawls let into the lower face of said sheave, said pawls engaging in said recesses in the top face of said bed plate, and coöperating with said pawls in the bottom face of said top plate, whereby said sheave is free to rotate in one direction with reference to said bed plate and top plate, but not in the opposite direction; means for imparting a limited reciprocating motion of rotation to said top plate; means for securing said windlass solidly to the deck or floor; a trip ring to trip said pawls in the bottom of said top plate; a trip ring to trip said pawls in the bottom of said sheave; lock blocks for locking said trip rings in position.

4. In windlasses, in combination; a top plate having a recess in its lower face; a trunnioned pawl, fitting into said recess; immediately below said top plate, a sheave with a recess in its upper face, said recess registering with the body of the pawl, but not with the trunnions, whereby said trunnions are supported by the upper face of said sheave, while the free end of the pawl is free to drop into and lock with said recess in the sheave.

5. In windlasses, in combination, a sheave having a recess in its lower face; a trunnioned pawl fitting into said recess; immediately below said sheave, a bed plate with a recess in its upper face, said recess registering with the body of the pawl, but not with the trunnions, whereby said trunnions are supported by the upper face of said bed plate, while the free end of the pawl is free to drop into and lock with said recess in said bed plate.

CIPRIANO ANDRADE, Jr.

Witnesses:
ARTHUR C. JOHNSON,
ADOLPH WIDDER.

It is hereby certified that in Letters Patent No. 971,716, granted October 4, 1910, upon the application of Cipriano Andrade, Jr., of New York, N. Y., for an improvement in "Windlasses," an error appears in the printed specification requiring correction as follows: Page 3, line 18, the reference-letter "S" should read E; and that the said Letters Patent should be read with this correction therein that the same may conform to the record of the case in the Patent Office.

Signed and sealed this 25th day of October, A. D., 1910.

[SEAL.]

E. B. MOORE,
*Commissioner of Patents.*